United States Patent

Schaeffler

[11] Patent Number: 4,567,695
[45] Date of Patent: Feb. 4, 1986

[54] METHOD AND APPARATUS FOR MACHINING ROLLER BEARINGS

[75] Inventor: Georg Schaeffler, Herzogenaurach, Fed. Rep. of Germany

[73] Assignee: INA Walzlager Schaeffler KG, Fed. Rep. of Germany

[21] Appl. No.: 591,769

[22] Filed: Mar. 21, 1984

[30] Foreign Application Priority Data

Mar. 29, 1983 [DE] Fed. Rep. of Germany ....... 3311389
Jul. 30, 1983 [DE] Fed. Rep. of Germany ....... 3327579

[51] Int. Cl.⁴ .......................... B24B 1/00; B24B 5/06
[52] U.S. Cl. .................................. 51/291; 51/237 R;
51/227 R; 51/5 A; 279/1 W; 279/1 E
[58] Field of Search ......... 51/236, 237, 5 A, 290-291,
51/217 R, 227 R; 279/46 R, 46 A, 1 E, 1 W, 1
D, 1 SG, 41 R, 41 A, 23, 29, 9 R, 2 R; 409/205,
232, 225, 165

[56] References Cited

U.S. PATENT DOCUMENTS

| | | | |
|---|---|---|---|
| 2,465,867 | 3/1949 | Gargano | 51/290 X |
| 2,989,327 | 6/1961 | Hermanus | 279/2 X |
| 3,570,194 | 3/1971 | Hohler et al. | 51/236 X |
| 3,602,521 | 8/1971 | Uhtenwoldt | 51/227 R X |
| 4,290,236 | 9/1981 | Brewer et al. | 51/227 R X |

FOREIGN PATENT DOCUMENTS

164814  8/1964  U.S.S.R. ............................. 51/237

Primary Examiner—Frederick R. Schmidt
Assistant Examiner—Debra S. Meislin
Attorney, Agent, or Firm—Bierman, Peroff & Muserlian

[57] ABSTRACT

An improved method of machining the raceway of a roller bearing race for cylindrical rollers having two concentric cylindrical surfaces with one surface being the raceway and the other cylindrical surface being the seating surface of the roller bearing race comprising elastically compressing the seating surface to assume an exactly cylindrical shape, shaping the raceway surface by chip removal into an exactly cylindrical form concentric with the seating surface and removing the compression pressure and novel apparatus for carrying out the method.

6 Claims, 2 Drawing Figures

METHOD AND APPARATUS FOR MACHINING ROLLER BEARINGS

STATE OF THE ART

Roller bearing races are produced either with chip removal on a lathe or chiplessly such as by deep-drawing, extrusion or the like. In chip-removing production, a very high accuracy of form of the race can be obtained which, however, is partially lost again in the subsequent heat treatment. Races produced chiplessly, especially thin-walled races such as those drawn from sheet metal have from the start a lower degree of accuracy of form which is approved further during the subsequent heat treatment with decreasing wall thickness. Races drawn from sheet metal therefore show for example in the finished state a relatively great out-of-roundness but generally, this does not matter since these races are given their final form and also their final diameter dimensions only when pressed into the housing bore. Therefore, despite existing out-of-roundness if a good wall thickness constant over the entire circumference is provided in such races, they will still constitute very precise bearings after installation in a housing bore.

There are cases where the surface quality attained in the drawing process is deemed in sufficient for a roller race so that a subsequent chip-removing precision machining, e.g. by grinding, is deemed necessary. When such a roller bearing race which has lost its roundness during the heat treatment is thereafter subjected to grinding of its raceway an exactly cylindrical track is created. However, in this form the race would not be unusable because during the subsequent pressing into a housing bore or onto a shaft, its seating surface would assume the cylindrical contour thereof whereby the ground raceway would be given a non-circular contour and thus could be unusable as roller bearing raceway. For this reason, previous practice has been to regrind the races both on their seating surface and on their raceway to obtain in the initial state exactly cylindrical surfaces both on the outer surface and in the bore. This procedure is not only extremely costly, but it also involves the disadvantage that such races, if they are surface hardened, must have relatively great surface hardening depths, because a part thereof is removed again during the grinding operation. Another disadvantage is found to be that after the grinding, because of the previously existing out-of-roundness of the race, the then remaining case-hardening depths are quite irregular over the circumference of the raceway.

OBJECTS OF THE INVENTION

It is an object of the invention to avoid the described disadvantages and to provide a simple and low-cost method of machining the raceway of a roller bearing race, which while avoiding one operation makes it possible to produce a race precision-machined in its raceway and having high precision after its installation, and for which, if the race is segment-hardened, ordinary hardening depths are sufficient.

It is another object of the invention to provide novel apparatus for effecting the machining method.

These and other objects and advantages of the invention will become obvious from the following detailed description.

THE INVENTION

The novel method of the invention for machining the raceway of a roller bearing race for cylindrical rollers having two concentric cylindrical surfaces with one surface being the raceway and the other cylindrical surface being the seating surface of the roller bearing race comprises elastically compressing the seating surface to assume an exactly cylindrical shape, shaping the raceway surface by chip removal into an exactly cylindrical form concentric with the seating surface and removing the compression pressure.

The seating surface is shaped elastically by the pressure means acting thereon so that it assumes an exact cylindrical form and the chip removal brings the raceway into an exact cylindrical form exactly concentric with the seating surface. The roller bearing race which for instance originally had a very good accuracy of form and which loses its roundness during a subsequent heat treatment when it receives a hardened layer of the normal depth, is firstly pressed by the pressure means into its original form, which it will also obtain again after its installation into a housing bore. In this form, the exactly cylindrical track is then precision-machined and when such a race is removed from the pressure means after the raceway machining, it will return elastically to its out-of-round initial form, but it will have an exactly cylindrical and high-quality roller raceway surface.

The advantages which in the foregoing have been set forth in the example of a hardened race occur not only in such races, but are found in greater or lesser degree also in depth-hardened races, or also in races which are subjected to precision machining of the raceway surface prior to hardening.

An apparatus for effecting the method of the invention is comprised of a molding means containing a plurality of closely packed, spring-like discs with a one circumferential surface contacting a pressure means and the other circumferential surface contacting the seating surface of a race means for inserting a race in contact with the disc and an axial pressure means to reduce the inclination of the axis of the discs to render the seating surface exactly cylindrical.

These clamping means are known and are especially well suited for the present invention since during their shaping, the spring like disc exert a perfectly uniform radial pressure over the entire circumference of the race, thereby ensuring that the seating surface thereof is given an exactly cylindrical form.

Another apparatus for effecting the method of the invention is comprised a spindle provided with a bore containing a pressure ram and connected to a housing provided with a hollow-cylindrical sleeve whose bore is dimensioned for insertion of a race under prestress. In this apparatus, the holding of the race is effected solely by its axial displacement into the bore of the sleeve without any additional radially moveable holding means.

The cylindrical sleeve may be disposed in a housing fastened to a work-piece spindle of a machine tool, especially a bore grinding machine and a longitudinally displaceable ram is disposed in the spindle to act on the end face of the bearing race for effecting pushing it in and out of the cylindrical sleeve. It has been found that for this apparatus a single longitudinally displaceable ram is sufficient for pushing the bearing race into the cylindrical sleeve as well as for pushing it out of the sleeve after completion of the machining.

Preferably a radially outward directed shaft is provided in the housing for the cylindrical sleeve between the sleeve and the ram whereby a bearing race can be introduced from the outside. Then a race which has been pressed into the cylindrical sleeve can be machined in its bore e.g. by means of a grinding wheel and after completion of the grinding operation, the spindle can be stopped in a position so that the shaft in the housing points upward. An as yet unmachined bearing race can then be introduced into this shaft and is then moved by the longitudinally sliding ram in the spindle in the direction of the cylindrical sleeve and is pressed into the bore of the sleeve and at the same time pushes the machined bearing race ahead of it, thus ejecting it from the cylindrical sleeve.

Referring to the drawings.

Figure 1:
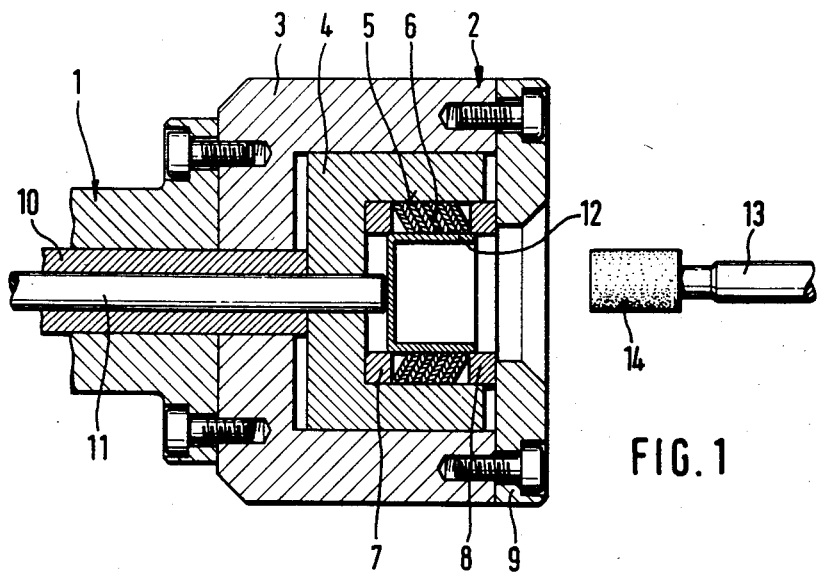
FIG. 1 is a longitudinal cross-section of an embodiment of an apparatus of the invention provided with spray-like discs.

FIG. 1 the spindle of a grinding machine has attached to it a chuck 2 consisting of the chuck housing 3 in which is mounted the pressure element 4 for longitudinal displacement which receives in its bore 5 a packet of closely packed spring-like discs 6. These discs are inclined to the longitudinal axis of the chuck and are supported on their outer surface in bore 5. They are axially supported by pressure rings 7 and 8 with ring 7 abutting the pressure element 4 and ring 8 on the cover 9 of chuck housing 3. A hollow-cylindrical pressure rod 10 passing through spindle 1 acts on the pressure element 4 and pressure rod 10 receives in its bore an ejector 11. The pressure rod 10 as well as the ejector 11 are actuated hydraulically in a known manner.

The method of operation of this apparatus for the method of the invention is as follows: The outer race 12 to be machined which in FIG. 1 is formed as a bushing whose bottom is closed at the left end is placed in the bore of the spring-like discs 6. Then pressure is applied on the pressure rod 10, whereby it moves the pressure element 4 to the right and in so doing presses via pressure ring 7 onto the packet of spring-like disc 6, which on the other side are supported by the pressure ring 8 and the cover 9. Due to this exertion of axial pressure onto the spring-like discs 6, their inclination to the chuck axis is reduced, whereby at this time their bore diameter is reduced so that they are supported on the outer surface of outer race 12 and, upon further deformation, bring this outer surface into an exactly cylindrical form. In this state the spindle is set in rotation and in a known manner the grinding wheel 14 rotating on spindle 13 is moved into the bore of the outer race 12 and brought into grinding engagement therewith. After completion of the grinding of the bore of race 12, the grinding wheel is retracted and the clamping of race 12 is relieved by removing of pressure on pressure rod 10 and the roller bearing outer race is removed from the chuck by ejector 11.

Figure 2:
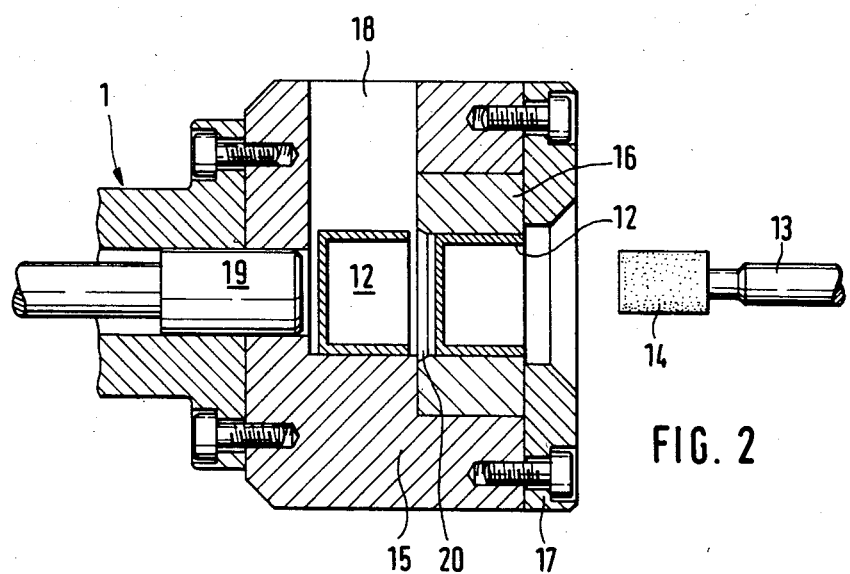
FIG. 2 is another embodiment of the apparatus of the invention.

In FIG. 2, the spindle 1 is attached to housing 15 which receives the cylindrical sleeve 16 in a bore and is secured by cover 17 held in place by screens. Housing 15 is provided behind cylindrical sleeve 16, with the radially outward shaft 18 and ram 19 is mounted for longitudinal displacement in spindle 1.

At the beginning of a machining operation, an outer race 12 is introduced via shaft 18, and it is pressed by axial displacement of ram 19 into cylindrical sleeve 16. To facilitate introduction of the outer race into sleeve 16, the latter has a chamber 20 at its left end. In this state, the spindle 1 is set in rotation and in a known manner the grinding wheel 14 rotating on spindle 13 is moved into the bore of outer race 12 and brought into grinding engagement therewith. After completion of the grinding of the bore of race 12, the grinding wheel is retracted and then the spindle is stopped in a position so that shaft 18 is directed upward. An as yet unmachined outer race 12 is introduced through this shaft and when ram 19 is actuated again, the new outer race 12 is simultaneously pressed into the bore of cylindrical sleeve 16 and the finished-machined outer race is pushed out of it.

Various modifications of the method and apparatus of the invention may be made without departing from the spirit or scope thereof and it is to be understood that the invention is intended to be limited only as defined in the appended claims.

What I claim is:

1. A method of machining the raceway of a rolling bearing race for cylindrical rollers having in an assembled state two concentric exactly cylindrical surfaces with one cylindrical surface being a raceway and the other cylindrical surface being a seating surface of the rolling bearing race which method starts from a blank whose raceway surface and seating surface have variations from the exactly cylindrical surface, the method comprising elastically deforming the seating surface by pressure exerted on it to assume an exactly cylindrical shape, then shaping the raceway by chip removal into a surface exactly cylindrical and exactly concentric with the seating surface and finally removing the pressure.

2. The method of claim 1 comprising subjecting the rolling bearing race to case hardening before shaping the raceway.

3. The method of claim 1 comprising shaping the raceway by grinding.

4. The method of claim 2 comprising shaping the raceway by grinding.

5. The method of claim 1 comprising exerting the pressure on the seating surface by inserting the rolling bearing race with its seating surface into the bore of a hollow-cylindrical sleeve by force.

6. The method of claim 5 comprising inserting the rolling bearing race into the bore of the sleeve by acting on the end face of the roller bearing race with a longitudinally slidable ram.

* * * * *